United States Patent
Kvochko et al.

(10) Patent No.: US 11,468,356 B2
(45) Date of Patent: Oct. 11, 2022

(54) MATRIX-BASED QUANTUM-RESILIENT SERVER-CLUSTER

(71) Applicant: Bank of America Corporation, Charlotte, NC (US)

(72) Inventors: Elena Kvochko, New York, NY (US); Maria Carolina Barraza Enciso, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 511 days.

(21) Appl. No.: 16/670,907

(22) Filed: Oct. 31, 2019

(65) Prior Publication Data
US 2021/0133615 A1 May 6, 2021

(51) Int. Cl.
*G06N 10/00* (2022.01)
*G06F 15/173* (2006.01)
*G06F 7/58* (2006.01)

(52) U.S. Cl.
CPC ............. *G06N 10/00* (2019.01); *G06F 7/588* (2013.01); *G06F 15/173* (2013.01)

(58) Field of Classification Search
USPC .......................................................... 706/62
See application file for complete search history.

(56) References Cited

U.S. PATENT DOCUMENTS

| | | |
|---|---|---|
| 7,178,277 B2 | 2/2007 | Takeuchi |
| 7,519,641 B2 | 4/2009 | Ribordy et al. |
| 7,577,257 B2 | 8/2009 | Xia et al. |
| 7,590,868 B2 | 9/2009 | Musa et al. |
| 7,697,693 B1 | 4/2010 | Elliott |
| 7,706,535 B1 | 4/2010 | Pearson et al. |
| 7,929,700 B2 | 4/2011 | Lodewyck et al. |
| 8,340,298 B2 | 12/2012 | Gelfond et al. |
| 8,483,394 B2 | 7/2013 | Nordholt et al. |
| 8,582,769 B2 | 11/2013 | Zhao et al. |
| 8,639,932 B2 | 1/2014 | Wiseman et al. |

(Continued)

OTHER PUBLICATIONS

Quintessence et al.; Quantum Tunneling Away From Cyber Criminals; Feb. 2018 Quintessence Labs. (Year: 2018).

(Continued)

*Primary Examiner* — Bryce M Aisaka
(74) *Attorney, Agent, or Firm* — Weiss & Arons LLP

(57) ABSTRACT

Methods for randomly storing data received at a plurality of silicon-based devices included in a matrix-computer-cluster are provided. The silicon-based devices may be arranged in predetermined rows within the matrix-computer-cluster. The matrix-computer-cluster may include a matrix formation of x, y and z coordinates. Methods may encapsulate a first device in a first quantum case. Methods may receive a data element at the first device. Methods may intercept the data element at the first case. Methods may generate a random number sequence at a first quantum random number generator included in the first case. The random number sequence may identify a set of x, y and z coordinates. Methods may determine a second device located within the matrix-computer-cluster that corresponds to the identified set of x, y and z coordinates. Methods may include transmitting the data element to second device, and storing the data element at the second device.

20 Claims, 6 Drawing Sheets

(56) References Cited

U.S. PATENT DOCUMENTS

| | | | |
|---|---|---|---|
| 8,650,401 | B2 | 2/2014 | Wiseman et al. |
| 8,693,691 | B2 | 4/2014 | Jacobs |
| 8,744,075 | B2 | 6/2014 | Tanaka |
| 8,897,449 | B1 | 11/2014 | Broadbent |
| 8,903,094 | B2 | 12/2014 | Bovino |
| 9,663,358 | B1 | 5/2017 | Cory et al. |
| 10,127,499 | B1 | 11/2018 | Rigetti et al. |
| 10,296,047 | B2 | 5/2019 | Kallman et al. |
| 10,348,493 | B2 | 7/2019 | Fu et al. |
| 10,644,882 | B2 | 5/2020 | Kurian |
| 10,708,046 | B1 | 7/2020 | Ashrafi |
| 10,802,800 | B1 | 10/2020 | Vakili |
| 11,120,357 | B2 | 9/2021 | Zeng et al. |
| 2010/0223385 | A1 | 9/2010 | Gulley et al. |
| 2011/0182428 | A1 | 7/2011 | Zhao et al. |
| 2011/0317836 | A1 | 12/2011 | Yeh et al. |
| 2013/0315395 | A1 | 11/2013 | Jacobs |
| 2014/0068765 | A1 | 3/2014 | Choi et al. |
| 2014/0355998 | A1 | 12/2014 | Tanzilli et al. |
| 2015/0199178 | A1* | 7/2015 | Shi .................... G06N 10/00 708/254 |
| 2016/0226840 | A1 | 8/2016 | Buccella et al. |
| 2017/0038793 | A1 | 2/2017 | Kallman et al. |
| 2017/0063827 | A1 | 3/2017 | Ricardo |
| 2018/0089733 | A1 | 3/2018 | Huang et al. |
| 2018/0240032 | A1 | 8/2018 | Van Rooyen |
| 2018/0309785 | A1 | 10/2018 | Kurian |
| 2018/0365585 | A1 | 12/2018 | Smith et al. |
| 2019/0026234 | A1 | 1/2019 | Harnik et al. |
| 2019/0097792 | A1 | 3/2019 | Howe et al. |
| 2019/0322298 | A1 | 10/2019 | Mong et al. |
| 2020/0043007 | A1 | 2/2020 | Simons |
| 2020/0274697 | A1 | 8/2020 | Ragan |
| 2020/0304292 | A1 | 9/2020 | Mochalov |
| 2020/0351089 | A1 | 11/2020 | Wentz |
| 2020/0387395 | A1 | 12/2020 | Viale et al. |
| 2021/0044433 | A1 | 2/2021 | Hay et al. |
| 2021/0081935 | A1 | 3/2021 | Faulkner et al. |
| 2021/0314143 | A1 | 10/2021 | Conner |

OTHER PUBLICATIONS

Jason M. Rubin, "Can a Computer Generate a Truly Random Number?" https://engineering.mit.edu/engage/ask-an-engineer/can-a-computer-generate-a-truly-random-number/, Nov. 1, 2011.

John Kelsey et al., "Cryptanalytic Attacks on Pseudorandom Number Generators," https://www.schneier.com/academic/paperfiles/paper-prngs.ndf, University of California Berkeley, 1998.

Tom Foremski, IBM Warns of Instant Breaking of Encryption by Quantum Computers: 'Move Your Data Today', https://www.zdnet.com/article/IBM-warns-of-instant-breaking-of-encryption-by-quantum-computers-move-your-data-today/, CBS Interactive, May 18, 2018.

John Cox, "New iOS App Secures IM Traffic with 'Post Quantum' Encryption Scheme PQChat Intended as Secure Alternative to WhatsApp," https://www.networkworld.com/article/2177124/new-ios-app-secures-im-traffic-with-post-quantum-encryption-scheme.html, Network World, May 23, 2014.

Jack Purcher, "Apple Patent Reveals Breakthrough Quantum Tunneling Touch-Sensitive Materials for iPhone, Smart Cases & More," https://www.patentlyapple.com/patently-apple/2017/02/apple-patent-reveals-breakthrough-quantum-tunneling-touch-sensitive-materials-for-iphone-smart-cases-more.html, Feb. 9, 2017.

Robert Samuel Hanson, "Quantum Computers will Break the Encryption that Protects the Internet,"https://www.economist.com/science-and-technology/2018/10/20/quantum-computers-will-break-the-encryption-that-protects-the-internet, The Economist, Oct. 20, 2018.

Cathal O'Connell, "Quantum Computing for the Qubit Curious," https://cosmosmagazine.com/physics/quantum-computing-for-the-qubits-curious, Cosmos, Aug. 8, 2016.

"Quantum Computing," https://en.wikipedia.org/wiki/Quantum_computing, Wikimedia Foundation, Inc., Jul. 14, 2019.

Lily Chen et al., "Report on Post-Quantum Cryptography," https://nvlpubs.nist.gov/nistpubs/ir/2016/NIST.IR.8105.pdf, National Institute of Standards and Technology, Apr. 2016.

"Security Token," https://en.wikipedia.org/wiki/Security_token, Wikimedia Foundation, Inc., Jun. 21, 2019.

Gorjan Alagic et al., "Status Report on the First Round of the NIST Post-Quantum Cryptography Standardization Process," https://www.nist.gov/publications/status-report-first-round-nist-post-quantum-cryptography-standardization-process, National Institute of Standards and Technology, Jan. 2019.

Christian S. Calude and Elena Calude, "The Road to Computational Supremacy," https://arxiv.org/pdf/1712.01356.pdf, Jan. 10, 2019.

Patrick Nohe, "What is an Air Gapped Computer?" https://www.thesslstore.com/blog/air-gapped-computer/, HashedOut, Mar. 13, 2018.

Emily Grumbling and Mark Horowitz, "Quantum Computing: Progress and Prospects," https://www.nap.edu/read/25196/chapter/1, National Academy of Sciences, 2018.

"An Introduction to High Availability Architecture," https://www.getfilecloud.com/blog/an-introduction-to-high-availability-architecture/, CodeLathe Technologies Inc., Retrieved on Sep. 26, 2019.

* cited by examiner

MATRIX-BASED QUANTUM-RESILIENT SERVER-CLUSTER

FIELD OF TECHNOLOGY

Aspects of the disclosure relate to server and device clusters.

BACKGROUND

Since the beginning of the computer era, computers have evolved from punch-card machines to the advanced computers of today. Moore's law teaches the principle that the speed and capability of computers can be expected to double every two years. This increase is a result of increases in the number of transistors contained by a microchip. Therefore, a 2019 smartphone may have more computing power than a 1960 mainframe.

Industrial entities may require greater computing power than a typical personal computer ("PC"). Industrial entities may also require greater computing throughput than a typical PC. Computing throughput may be understood to refer to the rate at which work is processed. A number of variations are available for computers with greater computing power. These variations may include mainframe computers, supercomputers, computer farms and computer clusters. It should be appreciated that the difference between mainframes, supercomputers, computer farms and computer clusters may not always be clear. Therefore, at times, a computer can be correctly classified in multiple classification categories.

Mainframe computers may be a variation of high-speed computers with large amounts of computing power. Mainframe computers are typically characterized as single unit, high-speed computers. Many mainframe computers may support numerous workstations or peripherals.

Mainframes may support a large number of simultaneous transactions and massive input/output and throughput without reducing computing speed. Specifically, mainframes may process terabytes of data in a short time.

Mainframes may maintain peak performance rates when the actual processing load is up to ninety percent (90%) of the total processing load. These performance rates are considerably better than the performance rates of standard computers that use standard processors. Standard computers that use standard processors, such as x86 (nomenclature for Intel® processors that have been released after the original 8086 processor) processors, or ARM (Advanced RISC (Reduced Instruction Set Computing) Machine) processors, may lose efficiency when the actual processing load is greater than twenty percent (20%) of the total processing load.

Mainframe operations may efficiently utilize resources. Specifically, in-box communications may enable efficient resource utilization. Mainframe resource utilization may be more efficient than standard server resource utilization. This increase in efficiency may result because mainframes utilize in-box communications, while standard servers, using typical processors, such as x86 and ARM, are limited by network communications.

Mainframe computers are usually specialty systems with custom operating systems. These specialty systems usually serve a specific, limited purpose. Such a purpose may include calculations, transaction processing, commercial exchange of goods, services and/or money.

There may be disadvantages to mainframe computers. Mainframes are very expensive and highly customized with custom operating systems. Therefore, mainframes are typically not flexible. Additionally, mainframes may require large amounts of resources to configure the customized systems and maintain the customized systems. For these reasons, among others, mainframe acquisition may be mostly limited to organizations that have specific processing needs.

A mainframe system may also provide a single point of failure to a system in which only one mainframe is operational. The single point of failure may result because all of the operations, including processing and input/output, are performed at a single location. As such, if a mainframe incurs a scheduled or unscheduled failure, the system may become out of service. Therefore, many organizations that operate with mainframes have a resilience plan. The resilience plan may include one or more additional mainframes that are available for backup in the event of a scheduled or unscheduled failure. In order for the backup to operate, the primary mainframe should be in continuous communication with the one or more additional mainframes. The communication may provide the ability to transfer a copy of the data included in the primary mainframe to the one or more additional mainframes.

Supercomputers are computers at the leading edge of data processing capability. Supercomputers are often a collection, grid or cluster of standard servers that comprise x86 or ARM processors. Supercomputers combine the computing power of multiple standard servers to execute high-performance computing. Such high-performance computing is used in solving complicated scientific and engineering problems.

Some of the advantages of supercomputers may include: the ability to focus processing power to execute a few programs or instructions as quickly as possible, and the ability to focus on speed and accelerated performance. Because of these advantages, supercomputers may extend the boundaries of hardware and software accomplishments.

Additionally, because supercomputers are comprised of multiple standard servers, in the event that a failure occurs, or maintenance is scheduled, on one or more of the server components, the supercomputer may remain operational. However, when a portion of the supercomputer is non-operational, the supercomputer may not operate at the same speed, or with the same amount of functions, as when it is fully operational.

Some of the disadvantages of supercomputers may include the large amount of energy and physical space required to operate a supercomputer. Additionally, building and maintaining a supercomputer is both resource consumptive and resource intensive.

Supercomputers are used in problems that require large amounts of computation for a single problem.

Specifically, scientific problems, engineering problems, weather predictions and nuclear simulations are executed on supercomputers.

Computer farms, also referred to herein as server farms, may be group of servers that, together, offer greater computing capacity for a particular goal than an individual server. The server farm may or may not be clustered. An example of a server farm may be a web farm. A web farm may include multiple load-balanced web servers, where each of the web servers includes the same, or similar, or closely-related, content and configurations.

Computer clusters may be a group of loosely, or tightly, connected computers that work together, so that they can be viewed as a single system. Computer clusters may be arranged in a specific physical formation. One example of a computer cluster may be colloquially known as the cloud.

The cloud may be a set of high-availability computers that may be accessed by one or more users for a plurality of related or unrelated computing tasks.

Therefore, it may be desirable to secure a system that is composed of components such as multiple devices, computers and/or servers. It would be further desirable to secure such systems at the component level without disrupting the nature of the multi-component architecture. It may be yet further desirable to utilize the distinct physical formation of a group of computers to further secure the system.

SUMMARY OF THE DISCLOSURE

A matrix-computer-cluster is provided. The matrix-computer-cluster may include a plurality of silicon-based devices. The silicon-based devices may be computers, internet-of-things ("IoT") devices or any other suitable devices. The plurality of silicon-based devices may be arranged in a matrix formation. The matrix formation may include x, y and z coordinates.

The silicon-based devices may be arranged within the cluster in predetermined rows. Each of the silicon-based devices may include, or be associated with, a unique set of x, y and z coordinates. Each device may be located in a location within the server-cluster. The location may correspond to the device's unique combination of x, y and z coordinates.

The matrix-computer-cluster may also include a plurality of quantum cases. A quantum case may be understood to refer to, for the purposes of this application, a housing that provides quantum-resilient properties to a device that is being housed within the quantum case. The device that is being housed within the quantum case may be a silicon-based device.

Each of the plurality of quantum cases may encapsulate one of the silicon-based devices. Each of the quantum cases may include a quantum random number generator. A quantum random number generator may be understood to refer to, for the purposes of this application, a device that uses quantum computing technology to generate random numbers. Each quantum random number generator may be configured to generate quantum random numbers. Quantum random numbers may be understood to refer to, for the purposes of this application, random numbers that are generated, at least in part, by a device that uses quantum computing technology. Because quantum random numbers are generated by a device that uses quantum technology, quantum random numbers may be resilient to cryptographic algorithms that can be decrypted by quantum computers.

Quantum random numbers may be used to encrypt messages. The encrypted messages may be transmitted from a silicon-based device. The silicon-based device may be housed within a quantum case that includes the quantum random number generator.

Messages transmitted between devices within the cluster may be randomly transmitted. The randomness of the transmission may be based on a random number generated by the quantum random number generator included in a quantum case. The quantum case may be included in the plurality of quantum cases.

Data received at the matrix-computer-cluster may be stored within one of the silicon-based devices. The silicon-based device that stores the data may be selected randomly by one of the quantum random number generators. The quantum random number generator may be included in a quantum case. The quantum case may be included in the plurality of quantum cases.

In some embodiments, the quantum case included in the plurality of quantum cases may be comprised of quantum-tunneling material. Each quantum case may be configured to communicate with devices external to the matrix-computer-cluster. The communications with external devices may leverage quantum-tunneling properties—i.e., the ability to tunnel through, and thereby communicate across, physical barriers. Each quantum case may be also be configured to communicate with the plurality of silicon-based devices within the matrix-computer-cluster. The communications may also, in certain embodiments, leverage quantum-tunneling properties.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
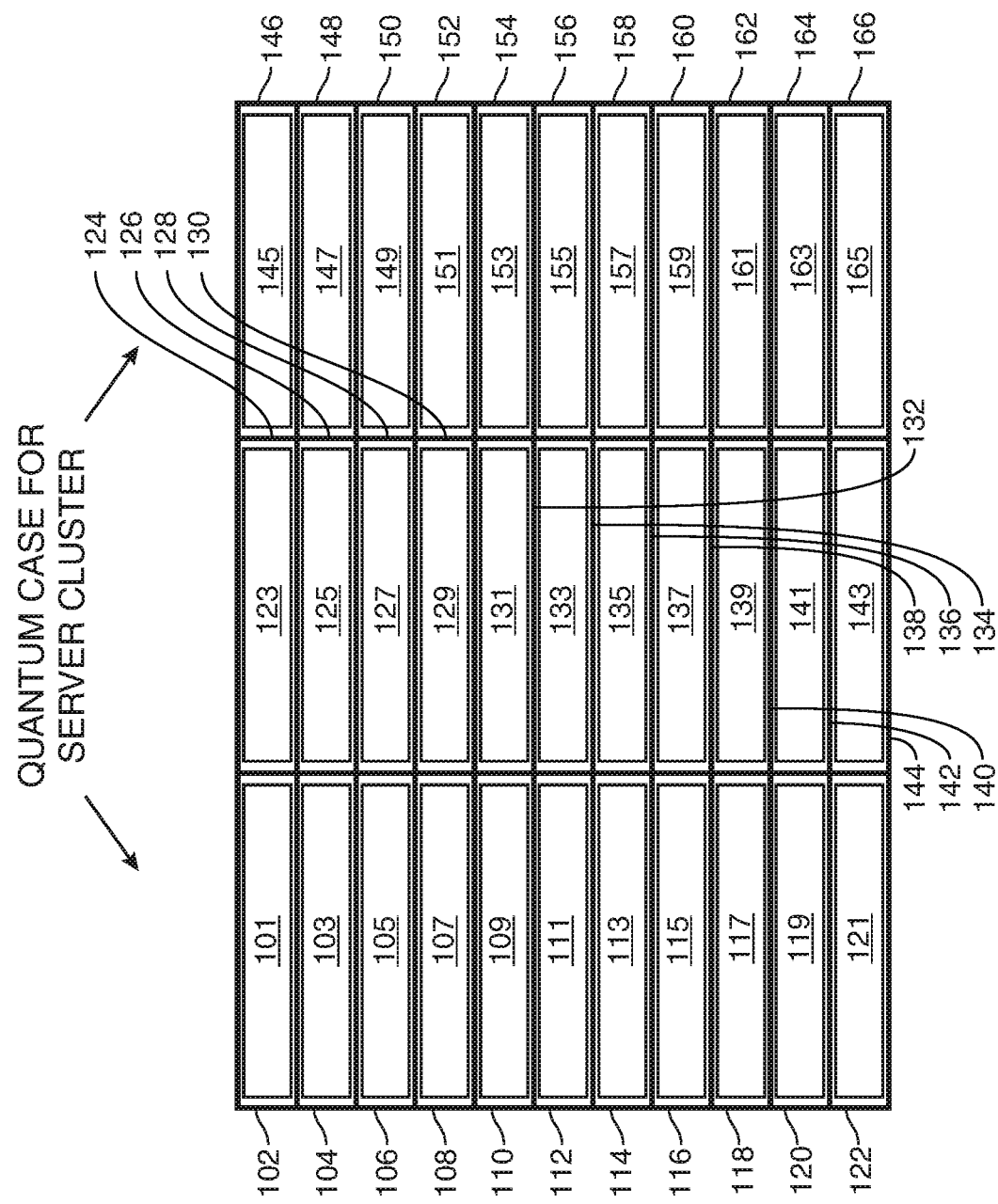
FIG. 1 shows an illustrative diagram in accordance with principles of the disclosure.

Apparatus and methods for randomly transmitting messages between a plurality of silicon-based devices included in a matrix-computer-cluster is provided. The plurality of silicon-based devices may be arranged in predetermined rows within the matrix-computer-cluster in a matrix formation. The matrix formation may include x, y and z coordinates.

The method may include encapsulating a first silicon-based device in a first quantum case. The first silicon-based device may be included in the plurality of silicon-based devices.

The method may include generating a message at the first silicon-based device. The method may include intercepting the message at the first quantum case.

The method may include generating a random number sequence at a first quantum random number generator. The first quantum random number generator may be included in the first quantum case.

The method may include using the random number sequence to identify a set of x, y and z coordinates. The method may include determining, or identifying, a second silicon-based device. The second silicon-based device may be located at a location within the matrix-computer-cluster that corresponds to the identified x, y and z coordinates.

The method may include transmitting the message from the first silicon-based device to the second silicon-based device. The transmission between the first silicon-based device and the second silicon-based device may be executed using quantum tunneling properties.

The method may include receiving the message at the second silicon-based device. The method may include storing the message at the second silicon-based device. The method may include transmitting the message from the second silicon-based device to an intended recipient device. The intended recipient device may be internal to and/or external of the matrix-computer-cluster.

The method may include generating a second quantum random number sequence at a quantum random number generator included in a second quantum case that encapsulates the second silicon-based device. The method may include encrypting the message at the second silicon-based device using the second quantum random number sequence. The method may include transmitting the encrypted message to a device external to the matrix-computer-cluster.

In some embodiments, the method may receive data for storage within the server-cluster. In these embodiments, the method may include receiving a data element at a first device. A first quantum case encapsulating the first device may intercept the data element. The first quantum case may generate a random number sequence that corresponds to a set of x, y and z coordinates. The data element may be transmitted to a second device that corresponds to the determined set of x, y and z coordinates. The data element may be stored at the second device.

The method may include receiving a request from a requesting device. The request may be to access the stored data element. In some embodiments, the method may include rerouting the request to the second silicon-based device. In these embodiments, the requesting device may be external to the matrix-computer-cluster. In certain embodiments, the method may include responding to the requesting device with data relating to the second silicon-based device. In these embodiments, the requesting device may be within the matrix-computer-cluster.

It should be appreciated that the rerouting the request to the second silicon-based device may also, at times, be executed when the requesting device is internal to the server-cluster. It should also be appreciated that, at times, responding to the requesting device with data relating to the second device may be executed when the requesting device is within the matrix-computer-cluster.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram. The illustrative diagram includes a server cluster. The server cluster may include multiple servers and/or multiple devices. Each server within the server cluster may be encased in a quantum case.

The server cluster may include servers 101, 103, 105, 107, 109, 111, 113, 115, 117, 119, 121, 123, 135, 137, 129, 131, 133, 135, 137, 139, 141, 143, 145, 147, 149, 151, 153, 155, 157, 159, 161, 163 and 165.

Each of the servers may be encapsulated in a quantum case. As shown in the first column, case 102 may encapsulate server 101. Case 104 may encapsulate server 103. Case 106 may encapsulate server 105. Case 108 may encapsulate server 107. Case 110 may encapsulate server 109. Case 112 may encapsulate server 111. Case 114 may encapsulate server 113. Case 116 may encapsulate server 115. Case 118 may encapsulate server 117. Case 120 may encapsulate server 119. Case 122 may encapsulate server 121.

As shown in the second column, case 124 may encapsulate server 123. Case 126 may encapsulate server 125. Case 128 may encapsulate server 127. Case 130 may encapsulate server 129. Case 132 may encapsulate server 131. Case 134 may encapsulate server 133. Case 136 may encapsulate server 135. Case 138 may encapsulate server 137. Case 140 may encapsulate server 139. Case 142 may encapsulate server 141. Case 144 may encapsulate server 143.

As shown in the third column, case 146 may encapsulate server 145. Case 148 may encapsulate server 147. Case 150 may encapsulate server 149. Case 152 may encapsulate server 151. Case 154 may encapsulate server 153. Case 156 may encapsulate server 155. Case 158 may encapsulate server 157. Case 160 may encapsulate server 159. Case 160 may encapsulate server 159. Case 162 may encapsulate server 161. Case 164 may encapsulate server 163. Case 166 may encapsulate server 165.

Each quantum case may include one or more modules. The modules may include a quantum communication module, a quantum random number generation module, a quantum encryption module and/or any other suitable modules.

The quantum communication module may enable communications between servers via the quantum cases. In some embodiments, the quantum communications module within a quantum case may intercept the transmitted communications and modify the communications prior to transmitting the communications to the intended recipient. In certain embodiments, the communications may be transmitted directly from one device to another server, thereby bypassing the quantum cases. Each of the quantum cases may communicate with each of the other quantum cases. Each of the servers may communicate with the each of the other servers.

The quantum random number generation module may generate quantum random numbers. Quantum random numbers may be generated, at least in part, using quantum technology. Random numbers generated by quantum technology may be true random numbers. True random numbers may be in contrast to pseudo-random numbers that are generated by silicon-devices. Encryption using true random numbers may be typically more difficult to decrypt.

The quantum encryption module may encrypt communications leaving the silicon-based device. The quantum encryption module may also decrypt communications that are incoming into the silicon-based device.

Figure 2:
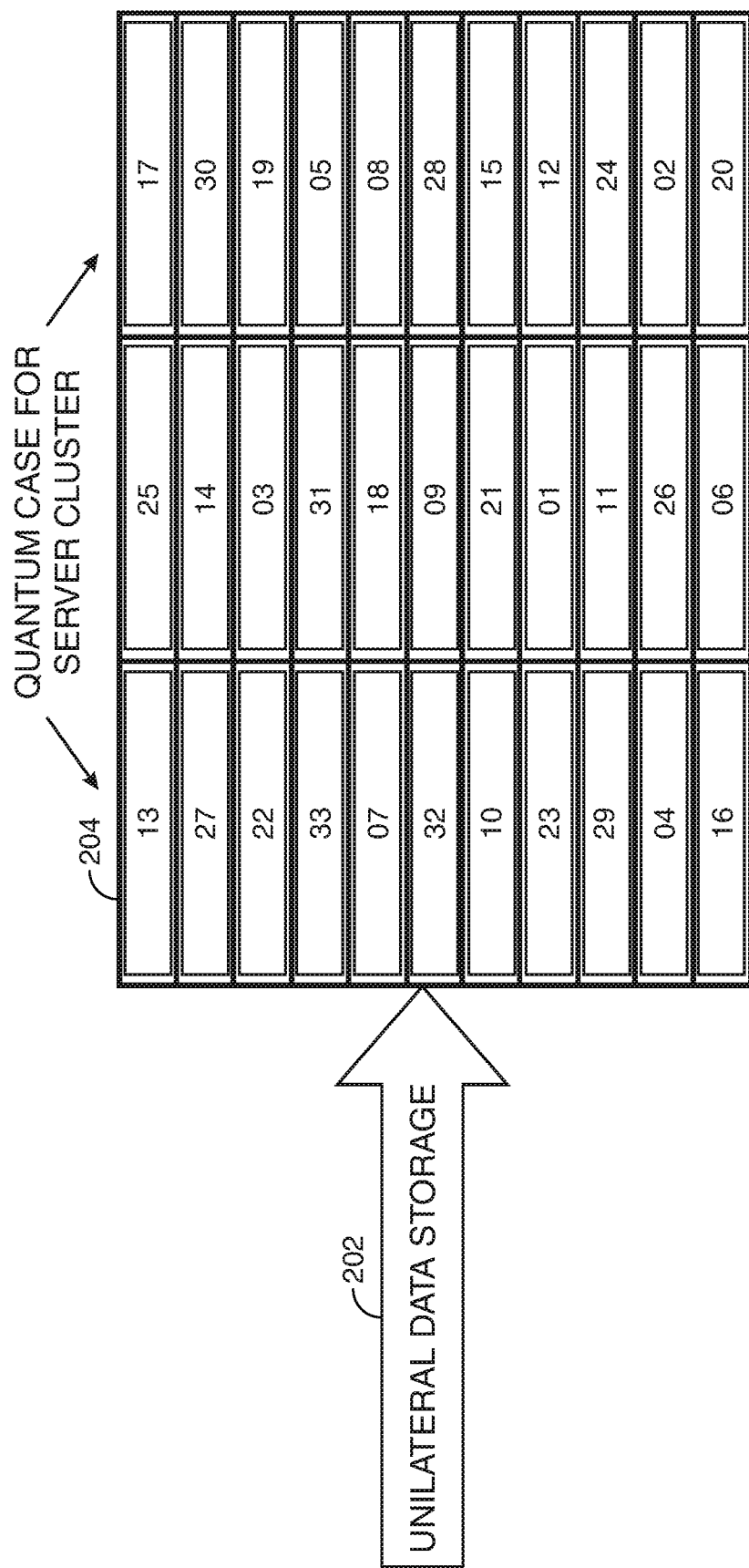
FIG. 2 shows another illustrative diagram in accordance with principles of the disclosure.

FIG. 2 shows an illustrative diagram. A data element, shown at 202, may be transmitted to server cluster 204. Incoming data may be stored in any one of the thirty-three servers included in the server-cluster. In order to secure and/or privatize the location of the data element, the server may be randomly selected from the server-cluster.

In some embodiments, each server within the server-cluster may be randomly assigned an identifying number, as shown within server cluster 204. Incoming data element 202 may then be randomly assigned to a server within the server-cluster. Upon the assignment, incoming data element 202 may be stored at the appropriate server.

It should be appreciated that the servers within the server-cluster may or may not maintain their identifying number. For example, the identifying numbers may be generated dynamically each time a data element is received. In another example, the identifying numbers may be continuously used to identify the servers.

Figure 3:
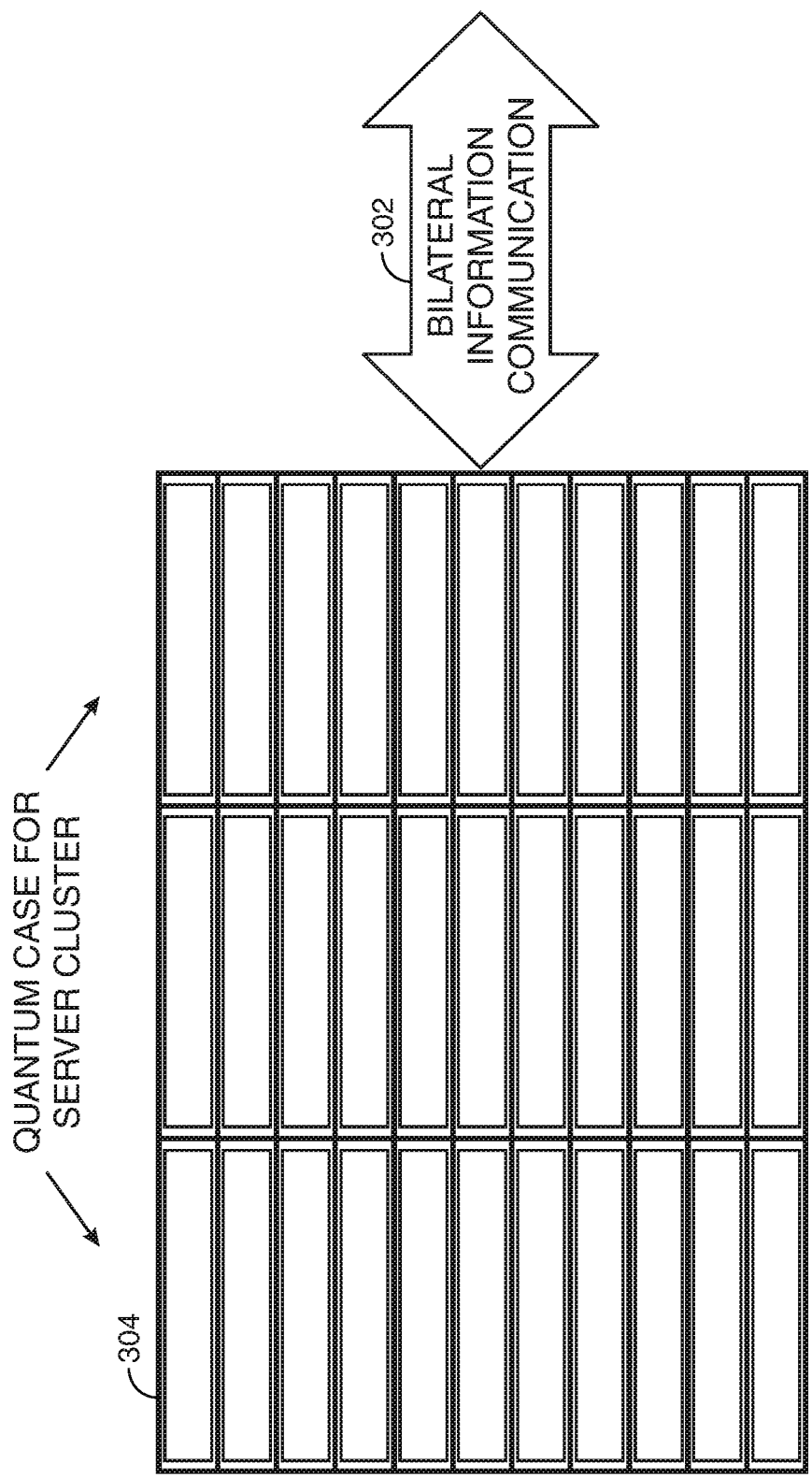
FIG. 3 shows yet another illustrative diagram in accordance with principles of the disclosure.

FIG. 3 shows an illustrative diagram. The illustrative diagram includes a server-cluster, shown at 304. The server-cluster includes multiple devices encased in quantum cases.

Bilateral communications may be transmitted to, and received from, the server-cluster, as shown at 302. The bilateral communications may be a request for data, information or any other suitable communication. In some embodiments, the bilateral communications may be exchanged with a specific server within the cluster. In certain embodiments, the bilateral communications may be suitable for selected servers within the server-cluster. In some embodiments, the bilateral communications may be suitable for all servers within the server-cluster. The communications received at the server-cluster may be routed through multiple servers until the communication is transmitted to one or more appropriate servers. The routing may be based on one or more random numbers generated by one or more quantum random number generators included in one or more quantum cases. This communication process may privatize and/or secure the locations of the servers and/or data included in the servers.

Figure 4:
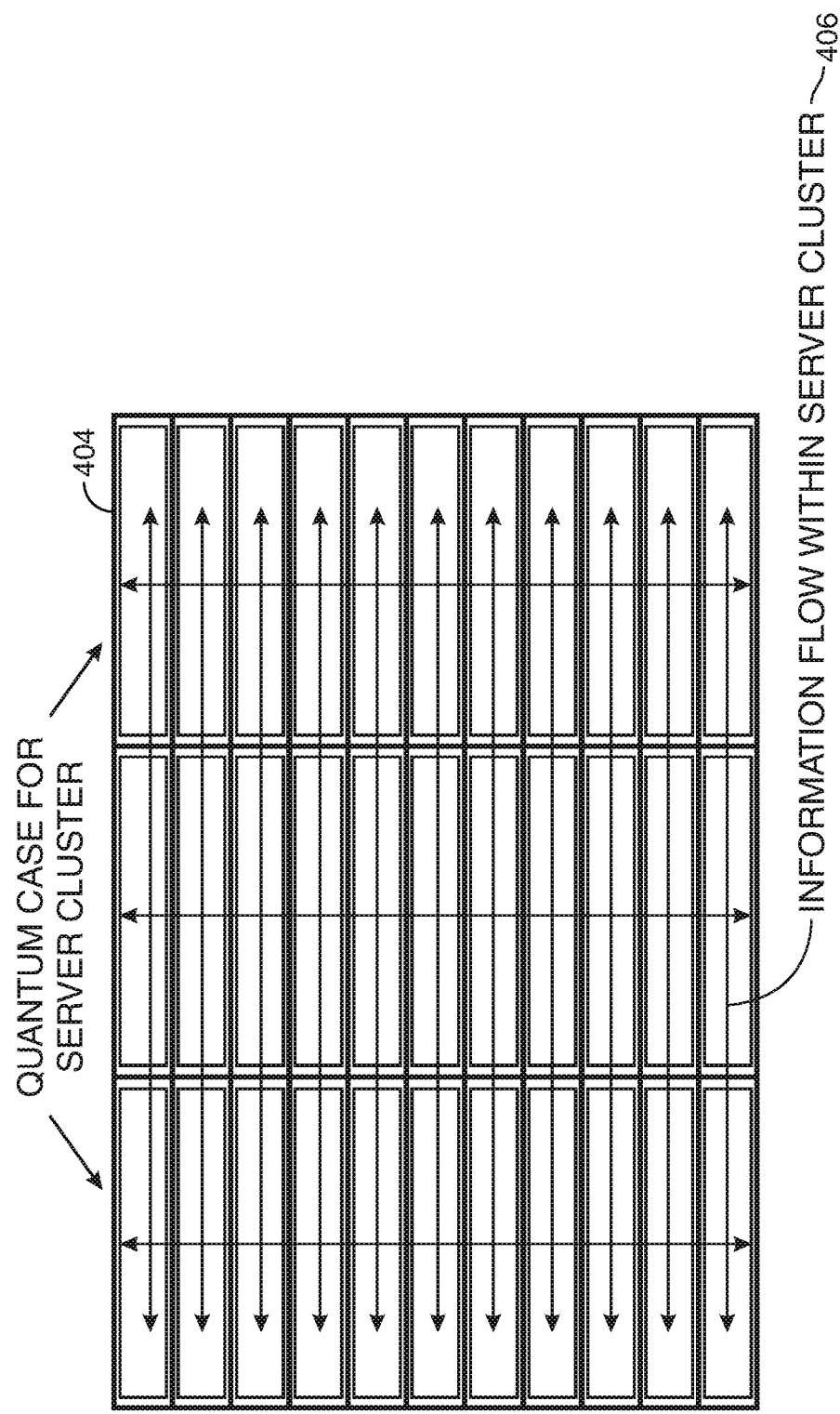
FIG. 4 shows still another illustrative diagram in accordance with principles of the disclosure.

FIG. 4 shows an illustrative diagram. The illustrative diagram includes a server-cluster, as shown at 404. The server-cluster may include multiple devices included in quantum cases.

Information and/or data may flow between the servers within the cluster in multiple directions, including vertical and horizontal, as shown at 406. It should be appreciated that information may also flow in a depth (z coordinate) direction (not shown).

The information flow between servers within the server-cluster may or may not utilize quantum tunneling technology, quantum-resilient encryption technology or other suitable quantum technologies.

Because the silicon-based devices may be within a network, it may not be necessary to communicate at all times with additional quantum-resilient technology within the cluster. However, in the event of a compromise—i.e., a server experiencing less than a predetermined level of security condition—within the server-cluster, the servers may be able to change to quantum-technology-based communications in order to secure the communications.

Figure 5:
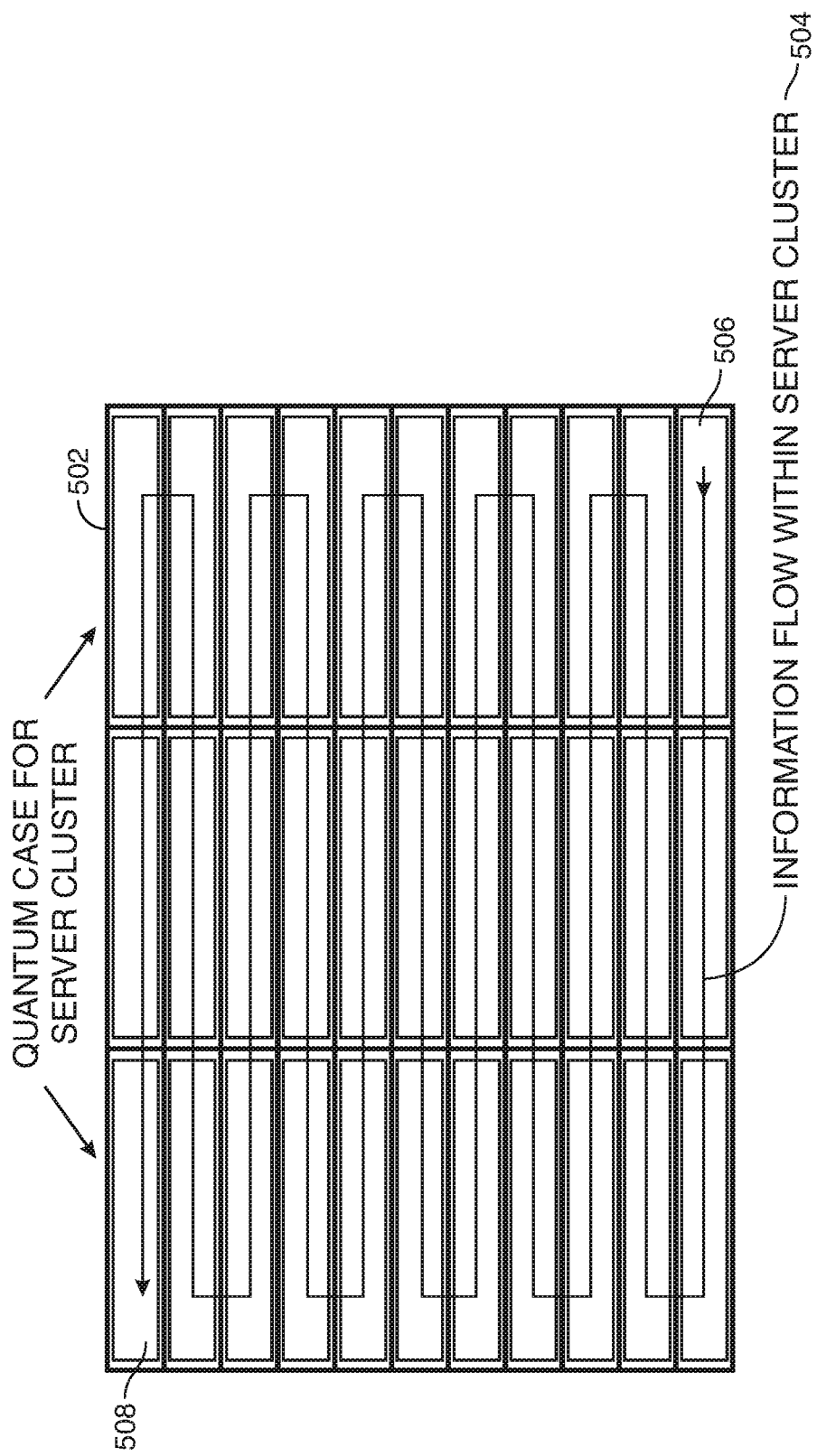
FIG. 5 shows yet another illustrative diagram in accordance with principles of the disclosure.

FIG. 5 shows an illustrative diagram. The illustrative diagram includes a server-cluster, as shown at 502. The information flow, shown at 504, within the server cluster may operate in a continuous single path information flow. In this embodiment, substantially all data and information received at the server-cluster may be received at server 506. Also, all information being transmitted from the server-cluster may be transmitted from server 508.

Figure 6:
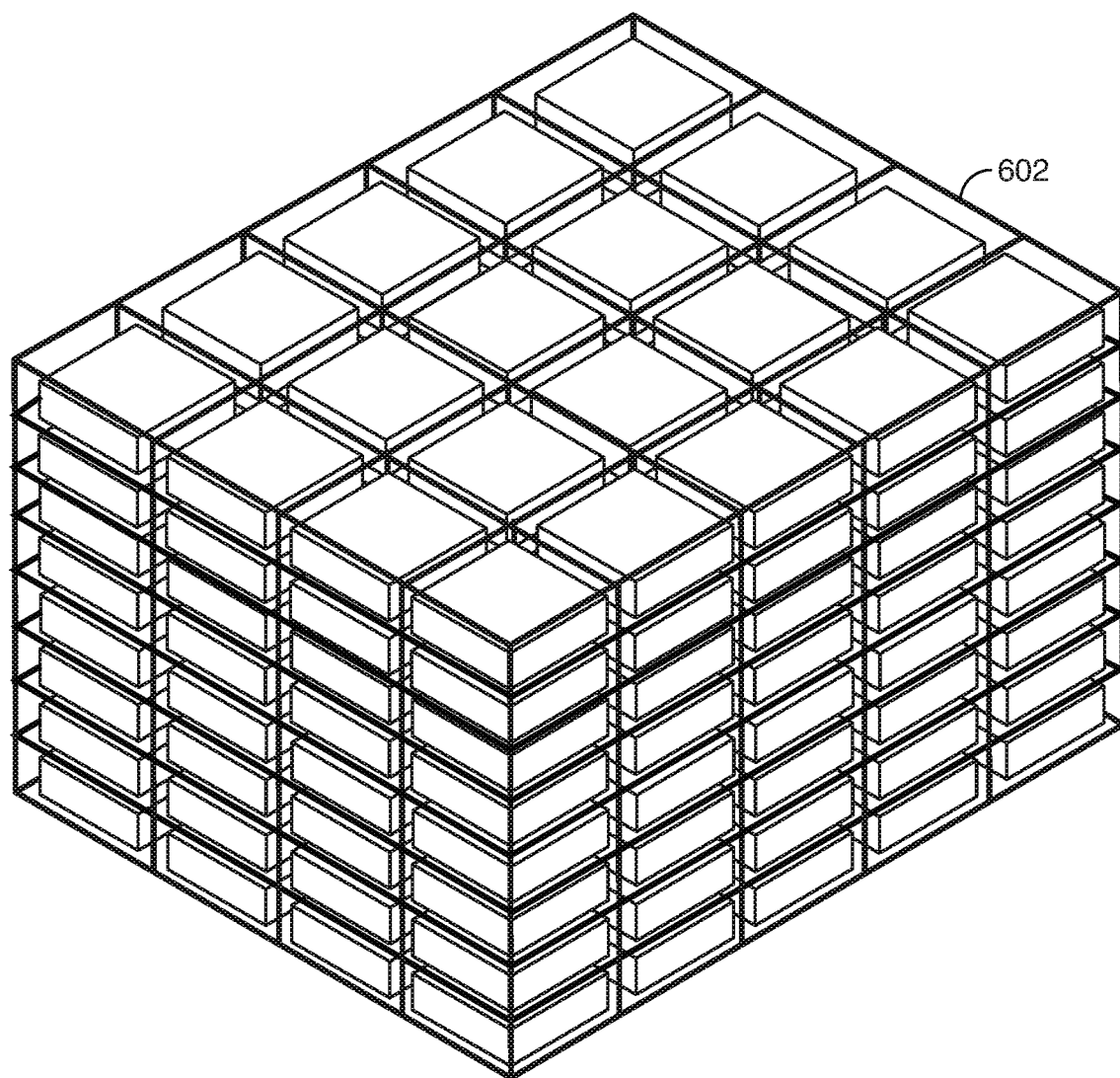
FIG. 6 shows still another illustrative diagram in accordance with principles of the disclosure.

FIG. 6 shows server-cluster 602. Server-cluster 602 may include multiple servers encased in multiple quantum cases. It should be appreciated that server-cluster 602 shows servers in three dimensions. The three dimensions may include x, y and z dimensions.

Thus, systems and methods for matrix-based quantum-resilient server-cluster have been provided. persons skilled in the art will appreciate that the present invention can be practiced by other than the described embodiments, which are presented for purposes of illustration rather than of limitation.

What is claimed is:

1. A matrix-computer-cluster comprising a plurality of silicon-based devices, the plurality of silicon-based devices being arranged in a matrix formation, the matrix formation comprising x, y and z coordinates, the matrix-computer-cluster comprising:
   the plurality of silicon-based devices, the plurality of silicon-based devices being arranged within the cluster in predetermined rows, each device included in the plurality of silicon-based devices comprising a unique set of x, y and z coordinates, each device being located in a location that corresponds to the device's unique set of x, y and z coordinates;
   a plurality of quantum cases, each of the plurality of the quantum cases encapsulating one of the silicon-based devices, each of quantum cases comprising:
      a quantum random number generator, the quantum random number generator configured to generate quantum random numbers, the generated quantum random numbers being used to encrypt messages that are transmitted from each silicon-based device included within the quantum case with which the quantum random number generator is included.

2. The matrix-computer-cluster of claim 1 wherein messages transmitted between devices within the cluster are randomly transmitted based on a random number generated by the quantum random number generator included in one of the quantum cases included in the plurality of quantum cases.

3. The matrix-computer-cluster of claim 2 wherein each quantum case is configured to communicate, leveraging quantum-tunneling properties, with devices external to the matrix-computer-cluster.

4. The matrix-computer-cluster of claim 2 wherein each quantum case is configured to communicate, leveraging quantum-tunneling properties, with the plurality of silicon-based devices.

5. The matrix-computer-cluster of claim 1 wherein data received at the matrix-computer-cluster is stored within one of the plurality of silicon-based devices and the one of the plurality of silicon-based devices is selected randomly by the one of the quantum random number generators included in a quantum case included in the plurality of quantum cases.

6. The matrix-computer-cluster of claim 1 wherein each quantum case included in the plurality of quantum cases is comprised of quantum-tunneling material.

7. A method for randomly transmitting messages between a plurality of silicon-based devices included in a matrixcomputer-cluster, the plurality of silicon-based devices being arranged in predetermined rows within the matrix-computer-cluster in a matrix formation, said matrix formation comprising x, y and z coordinates, the method comprising:

encapsulating a first silicon-based device, included in the plurality of silicon-based devices, in a first quantum case;

generating a message at the first silicon-based device;

intercepting the message at the first quantum case;

generating a random number sequence at a first quantum random number generator, the first quantum random number generator being included in the first quantum case;

using the random number sequence to identify a set of x, y and z coordinates;

determining a second silicon-based device located at a location within the matrix-computer-cluster that corresponds to the identified x, y and z coordinates;

transmitting the message from the first silicon-based device to the second silicon-based device; and receiving the message at the second silicon-based device.

8. The method of claim 7 wherein the transmitting the message between the first silicon-based device and the second silicon-based device is executed using quantum tunneling properties.

9. The method of claim 7 further comprising storing the message at the second silicon-based device.

10. The method of claim 7 further comprising transmitting the message from the second silicon-based device to an intended recipient device.

11. The method of claim 10 wherein the intended recipient device is a device internal to the matrix-computer-cluster.

12. The method of claim 10 wherein the intended recipient device is a device external to the matrix-computer-cluster.

13. The method of claim 12 further comprising:

generating a second quantum random number sequence at a quantum random number generator included in a second quantum case that encapsulates the second silicon-based device;

encrypting the message at the second silicon-based device with the second quantum random number sequence; and transmitting the encrypted message to the device external to the matrix-computer-cluster.

14. A method for randomly storing data received at a plurality of silicon-based devices included in a matrix-computer-cluster, the plurality of silicon-based devices being arranged in predetermined rows within the matrix-computer-cluster in a matrix formation, said matrix formation comprising x, y and z coordinates, the method comprising:

encapsulating a first silicon-based device, included in the plurality of silicon-based devices, in a first quantum case;

receiving a data element at the first silicon-based device;

intercepting the data element at the first quantum case;

generating a random number sequence at a first quantum random number generator, the first quantum random number generator being included in the first quantum case;

using the random number sequence to identify a set of x, y and z coordinates;

determining a second silicon-based device located at a location within the matrix-computer-cluster that corresponds to the identified set of x, y and z coordinates;

transmitting the data element from the first silicon-based device to the second silicon-based device; and storing the data element at the second silicon-based device.

15. The method of claim 14 wherein the transmitting the data element between the first silicon-based device and the second silicon-based device is executed using quantum tunneling properties.

16. The method of claim 14 wherein the data is received at the first silicon-based device using quantum tunneling properties.

17. The method of claim 14 further comprising:

receiving a request from a requesting device to access the data element at the first silicon-based device; and rerouting the request to the second silicon-based device.

18. The method of claim 17 wherein the requesting device is external to the matrix-computer-cluster.

19. The method of claim 14 further comprising:

receiving a request from a requesting device to access the data element at the first silicon-based device; and responding to the requesting device with data relating to the second silicon-based device.

20. The method of claim 19 wherein the requesting device is within the matrix-computer-cluster.

* * * * *